United States Patent
Cahoon

(10) Patent No.: US 7,233,857 B2
(45) Date of Patent: *Jun. 19, 2007

(54) PORTABLE MEMORY AUTOMOBILE IGNITION SYSTEM

(76) Inventor: Colin Paul Cahoon, 4346 Middleton Rd., Dallas, TX (US) 75229

( * ) Notice: Subject to any disclaimer, the term of this patent is extended or adjusted under 35 U.S.C. 154(b) by 0 days.

This patent is subject to a terminal disclaimer.

(21) Appl. No.: 11/236,167

(22) Filed: Sep. 27, 2005

(65) Prior Publication Data

US 2006/0161320 A1    Jul. 20, 2006

Related U.S. Application Data

(63) Continuation-in-part of application No. 11/037,620, filed on Jan. 18, 2005, now Pat. No. 7,006,914.

(51) Int. Cl.
*G06F 7/00* (2006.01)
*B60L 1/00* (2006.01)
*G06F 19/00* (2006.01)

(52) U.S. Cl. ..................... 701/115; 307/10.1
(58) Field of Classification Search ................ 701/115, 701/102, 1; 307/10.1, 10.4–10.6
See application file for complete search history.

(56) References Cited

U.S. PATENT DOCUMENTS

| 5,973,411 A | 10/1999 | Tado et al. |
| 6,711,474 B1 | 3/2004 | Treyz et al. |
| 7,006,914 B1 * | 2/2006 | Cahoon ..................... 701/115 |
| 2005/0021190 A1 | 1/2005 | Worrell et al. |
| 2005/0151422 A1 | 7/2005 | Gilmour |

FOREIGN PATENT DOCUMENTS

DE    2005001972 U1    5/2005

* cited by examiner

*Primary Examiner*—Hieu T. Vo
(74) *Attorney, Agent, or Firm*—Carstens & Cahoon, LLP; Colin P. Cahoon

(57) ABSTRACT

A portable memory device used in substitution of an automobile key and interfaced with an automobile onboard computer and ignition system. The portable memory device contains data that, when read by the onboard computer, enables the ignition system. The portable memory device is read and write capable, thereby allowing for data to be used by the onboard computer in conjunction with several automobile systems, and allowing for data to be transferred from said systems to the portable memory device by the onboard computer.

20 Claims, 2 Drawing Sheets

PORTABLE MEMORY AUTOMOBILE IGNITION SYSTEM

CROSS-REFERENCE TO RELATED APPLICATION

This application is a continuation-in-part of U.S. Patent Application Ser. No. 11/037,620, filed Jan. 18, 2005, now U.S. Pat. No. 7,006,914, issued on Feb. 28, 2006.

BACKGROUND

1. Technical Field

The present invention relates to a portable memory drive, used in substitution of an automobile (or other engine driven conveyance) key, and an integrated onboard computer and ignition system. Specifically, the invention relates to the use of a portable memory drive containing data which is downloaded to an onboard processing system in communication with the automobile's ignition system and other systems, such as the automobile's entertainment system and navigation system.

2. Background of the Invention

Automobile ignition systems, as well as onboard computer systems, have changed dramatically in the last decade. For example, many modern automobiles no longer use keys with unique physical features in order to enable ignition systems. Rather, the automobile senses electronic data from, for example, a chip within the ignition key or a chip installed on a credit card sized data device kept in the driver's wallet. This electronic data enables the ignition system in the automobile like the traditional key.

Onboard computing systems are now used to control a number of different devices, such as various engine controls. Many innovative uses for an onboard computer system are reviewed and disclosed in, for example, U.S. Pat. No. 6,711,474, issued to Tryz, et al. on Mar. 23, 2004, and titled "Automobile Personal Computer System."

In an unrelated field, the size, dependability, and storage capacity of small portable memory devices has advanced at a quick pace. For example, a large variety of "thumb drives" or "jump drives" are now offered for sale to the consumer, typically as USB portable flash drives. Examples of these devices include the Mini 64 MB USB 2.0 Flash Drive manufactured by IOMEGA, the 512 MB Data Traveler I Full-Speed USB manufactured by Kingston Technology, and several flash drives manufactured by LEXAR Media, including the 1 GB JumpDrive Elite USB Flash Drive. These devices now can store so much data that they are considered mass storage devices, in addition to being portable memory devices. Even the least expensive of these portable memory devices, retailing for under ten U.S. Dollars, is capable of storing large amounts of data, usually 64 MB or more. Yet, portable memory drives are, in many instances, no larger than a standard automobile ignition key. In fact, many of these devices are designed to be carried on key rings. The devices can be inserted in ports, for example a USB port, on a personal computer for reading or storing data, as they are both read and write capable. A common use for these portable memory devices is to transfer data from one computer to another. Music and video files can also be downloaded to these devices for playback on other media devices.

A need exists, therefore, for an automobile ignition system that combines leading edge automobile computer functions with the latest development in portable memory drives. Further, a need exists for an automobile ignition system that uses such portable memory devices for unique applications that are presently not available in the automotive field.

SUMMARY OF THE INVENTION

In a preferred embodiment, the invention utilizes as a mass storage device or portable memory device a USB portable flash drive containing unique data as a substitute for an automobile ignition key. This unique data, in combination with the portable memory device, provides numerous unique features to the automobile when all systems are integrated, including an onboard central processing unit, and are in communication with said portable memory device. The portable memory device is inserted in a receiving port installed on the automobile. This receiving port can be, for example, a USB port located near or on the steering column in a location traditionally used for an ignition key. The portable memory device is inserted in this port by the driver. The port is connected to an onboard computer or central processing unit which initiates a read step in order to read security data from the portable memory device required to begin the automobile ignition sequence. If such data is available on the memory device, the automobile can be started as if the physical key has enabled a standard ignition system.

Once the portable memory device has been installed, it is in communication with the onboard computer which, in turn, is in communication with a number of other automobile systems. By way of example, music files can be accessed that have been stored on the portable memory device for playback on the automobile's stereo system via the onboard computer. Likewise, video files that have been stored on the portable memory device can be accessed for playback on the automobile's installed video equipment.

Data can also flow in the other direction. For example, music can be recorded from the automobile's radio for storage on the portable memory device. Dictation into an onboard speaker or telephone conversations from an onboard telephone can also be recorded onto the portable memory device. Data on engine performance can be uploaded to the portable memory device and then downloaded later for analysis via a home computer and internet transmission.

Programmable driver unique settings can be stored on the portable memory device and read during the ignition sequence. For example, the driver's seat position, mirror positions, preset radio stations, and preferred temperature settings can all be stored on the portable memory device and read during the ignition sequence. All of these settings can also be changed and uploaded into the portable memory device by the driver.

Since the portable memory device is compatible with a standard personal computer, unique application-specific data can be loaded onto the portable memory device for use in the automobile while in operation. For example, adjustments to the automobile's engine monitoring and performance software can be made by downloading the data from the manufacturer's internet-based website to a personal computer and then onto the portable memory device. The data can then be accessed by the automobile's onboard computer. Such a system would make unnecessary the recall of automobiles to a maintenance facility to perform the same function.

Database access in integration with a unit's navigation system, such as an onboard Global Positioning System ("GPS") unit, can also greatly enhance the features provided by such system. For example, customized databases of interest to a particular driver can be downloaded onto the portable memory device for access in conjunction with the GPS positioning information. A driver that is interested in the history the area that is being driven through can, in advance, download the database that integrates historical information with specific geographical locations. This information can then be played through the automobile's entertainment system, either over its radio or onboard video system. This would enable a driving historical tour, as an example. Other navigation unit database information, such as dining recommendations or service station locations, can be easily updated by the same method.

The invention, therefore, provides an automobile (or other conveyance) ignition system that combines leading edge automobile computer functions with the latest development in portable memory devices. Further, the invention provides for an automobile ignition system that uses such portable memory devices for unique applications that are presently not available in the automotive field.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
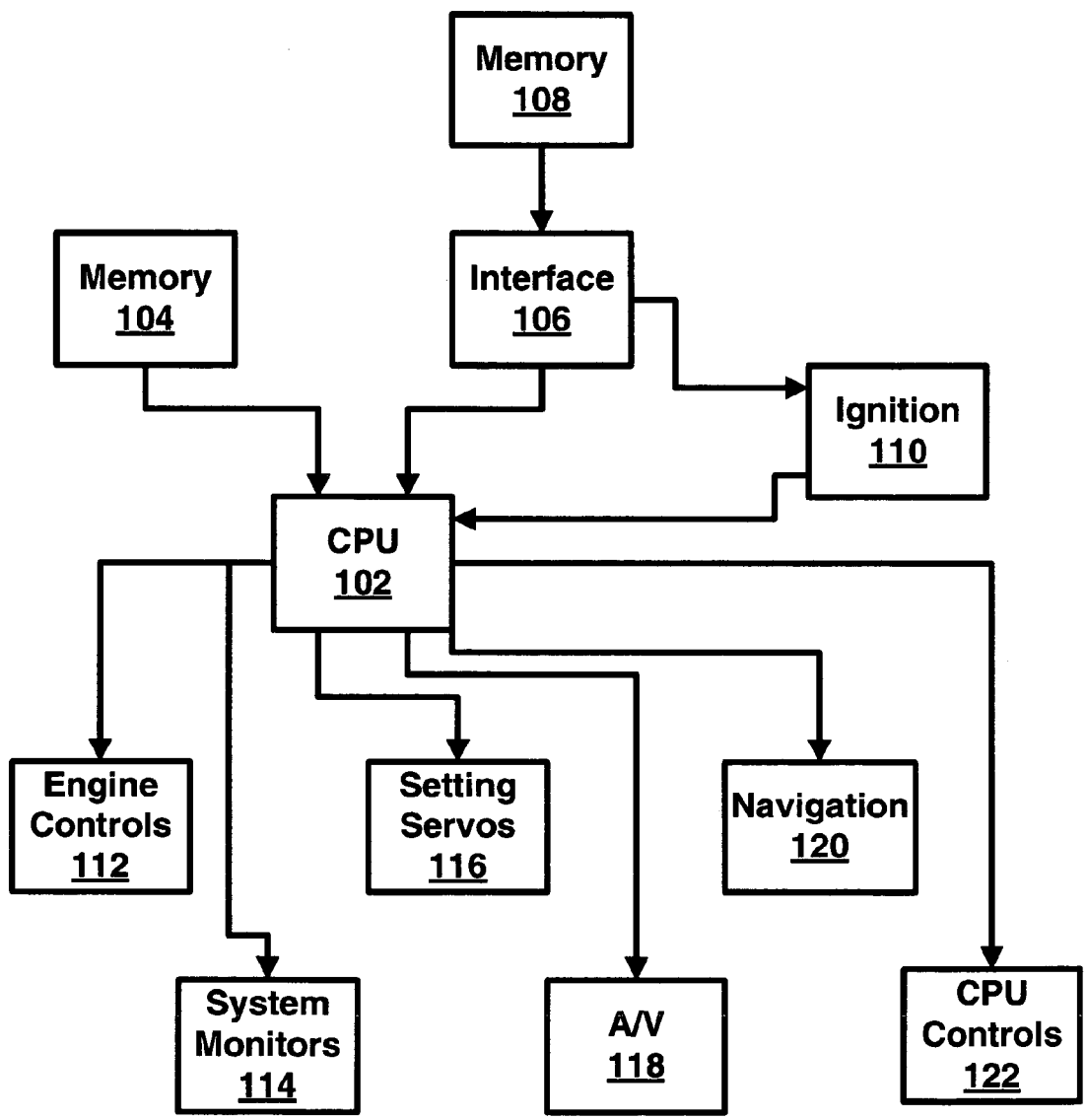
FIG. 1 is a flow chart showing the basic data flow of one embodiment of the invention.

FIG. 1 is a flow chart illustrating the data flow in one embodiment of the invention. The preferred embodiment of the invention utilizes an onboard computer that is installed in the automobile. In this application, the terms "computer," "central processing unit (CPU)," and "processing unit" are all used interchangeably and refer to any device capable of facilitating the execution of programming steps and interfacing with other systems and memory devices.

Referring to FIG. 1, the onboard computer 102 is interfaced with a memory device 104 that is also installed in the automobile or other conveyance, such as a boat, airplane, motorcycle, or any motorized conveyance (thus the terms "driver" and "operator" are used interchangeably herein). This memory device 104 may be internal to the onboard computer 102. The memory device 104 may also be a separate memory drive electrically connected to the computer 102, but located internal to the automobile and not easily removed. The onboard computer 102 is also electrically connected to an interface 106 to a portable memory device 108. This interface 106 in the preferred embodiment is a standard USB port common to personal computers. When referred to and claimed herein, "USB" means USB, USB 2.0, and any follow on development of such interface technology. In an alternative embodiment, this interface 106 is a "bluetooth" wireless interface. This interface 106 is provided in lieu of an ignition switch requiring a key. Consequently, the interface 106 is installed in the automobile in a location easily accessible to the driver when the driver is sitting in the driver's seat, such as on or near the steering column. This interface 106 installation can be done by the manufacturer or as an after market installation to, for example, a fleet of automobiles. In practice, the driver inserts the portable memory device 102 into the interface 106 in order to enable the ignition system 110 of the automobile. This act of inserting the memory device 108 into the interface 106 accomplishes all of the system enablements normally accomplished by the insertion of a physical key into the ignition switch of an automobile and, as will be described in more detail below, enables several other systems and features of the invention.

It should be understood that when using the terms "portable memory device" 108 and its "interface" 106, these terms are meant to include all technology allowing for the storage of data on portable memory devices 108 and their related interfaces 106 required to access the data on said devices 108. This includes, but is not limited to, FireWire, Memory Stick, USB 2.0 Micro Drive, ScanDisk, and similar present and emerging technologies. Any mass storage device 106 in a portable format, small enough to fit in a consumer's pocket, and the necessary interface 108 for same is contemplated by this invention, even such devices and interfaces that have not yet been developed but that can be used to accomplish the goals and results of the invention.

Software provided by the automobile manufacturer, or the manufacture of the systems described by the invention in the event of an after-market installation, allows the driver to use any off-the-shelf portable memory device or mass storage device 108 that is compatible with the interface 106 for use with the invention described herein. Without limitation, but by way of explanation, the automobile owner can utilize an off-the-shelf USB flash drive and import data onto this memory device 108 by software provided specifically for this purpose or downloading the data from an online source via the automobile owner's personal computer. Other devices 108 could include a micro drive such as originally developed by IBM or a wireless card using bluetooth technology. A biometric "fingerprint" reader can also be combined with the device 108 in order to enhance security. The data that is stored on the memory device 108 provides recognition data that the automobile's computer 102 reads and recognizes in order to enable the ignition sequence. This initiation data can be changed from time-to-time as a security feature or can be permanent read-only data. Cryptography and authentication sequences can be used such that security features are constantly changed.

An alternative embodiment of the invention allows for the automobile's ignition system to communicate independently with the portable memory device 108 by direct connection to the interface 106. This allows for automobile operation for systems configured such that the onboard computer 102 is not a necessary component of engine and other essential system operations.

Data stored on the portable memory device 108 can be processed by the onboard computer 102 in order to facilitate the operations of a number of the automobile systems. For example, various engine controls 112, controlling such things as fuel flow, air flow, and ignition timing, can be electrically connected to the onboard computer 102. When adjustments to such controls are found to be necessary or desirable, data facilitating such changes can be loaded onto the portable memory device 108 by, for example, downloading such information from a manufacturer's online source onto a personal computer and then onto the memory device 108. This data is then downloaded from the memory device 108 onto the automobile's computer 102 when installed in the interface 106. This data is then used by the computer 102 to change the engine control features 112 to facilitate the desired adjustments.

Many luxury and semi-luxury cars save desired driver preference settings on a number of comfort and/or entertainment features. For example, the driver's seat position, powered mirror position (controlled by setting servos 116), environmental control settings, and radio presets are all stored and registered to identify with a specific driver. Due to the limited storage capacity of these systems and the limited physical controls accessing devices used to manipulate this information, automobiles today store such driver preference settings for only a few (typically two) drivers. The instant invention facilitates such feature by storing setting information in the portable memory device 108 that allows the various setting servos 116 (and other devices) to move to the appropriate positions and settings when the driver associated with those positions and settings uses the memory device 108. Since every individual driver will have his own portable memory device 108, the instant invention facilitates the transfer of an infinite number of individual desired driver preference settings for any number of vehicles. Such capability is beneficial in the instance of a number of drivers sharing a single automobile, such as a company automobile shared by a number of individuals, and in instances when many automobiles are used by one or more individuals, such as a fleet of automobiles used by a number of different drivers. In the example of a fleet of automobiles, individual drivers can maintain their own personalized portable memory devices 108 for use on any of the fleet automobiles, thus allowing the instant adjustment of all driver preference settings as a part of the ignition sequence. Driver preferences for rental car company customers can also be stored the same way, so that the customer need not manually adjust mirrors and seat positions with every automobile rented. This information can be uploaded to the device 108 the first time the renter uses a rental vehicle and then downloaded to a central database upon return of the vehicle to the rental company. The next time the renter rents from the company, the data may be downloaded to a device 108 and used to set the same or similar preferences in the next rental vehicle. In an alternative embodiment, but having the same benefits, driver preference settings can be stored on the computer's onboard memory 104 with the driver recognition data stored on the portable memory device 108.

The portable memory device 108 can also provide data utilized with the entertainment or audio/visual (A/V) system in the automobile 118 (also referred to collectively as "entertainment media" by Applicant). Typically, the A/V system 118 comprises a stereo system (AM/FM radio receiver, Compact Disc drive, etc. . . . ) and, in many instances, includes a video system capable of playing DVD's or VHS tapes. Some automobiles further incorporate radio reception by satellite and television broadcast over the visual portion of the system. The instant invention allows for entertainment media to be downloaded onto the memory device 108 for use with the automobile's entertainment system 118. For example, music files can be downloaded from any number of sources, such as online sources or copied from music storage devices, onto the portable memory device 108. These music files are then accessed by the automobile's computer 102 and directed to the automobile's stereo system 118 for playback. The same basic concept is used to transfer video files from the portable memory device 108 to the automobile's video system 118.

In the fleet or rental car field, a specific genre of music, such as classic jazz or 1970's rock and roll, can be downloaded on a memory device 108 to match the known preferences of the renter or fleet driver.

The portable memory device 108 can also interface with the automobile's navigation system 120. Global Positioning System (GPS) units are becoming a common feature on automobiles. Such GPS units typically have a limited database containing street address information and logic that enables suggestions on routing. Some of these units also have a limited amount of information available on various services with logic that enables routing to such services, such as the most direct route to a known service station. Use of the portable memory card 108 allows for the updating of these databases as, for example, new streets are built or various businesses close or are added to certain locations. In other words, the portable memory device 108 allows for the periodic updating of all the database information on the navigation unit 120. This updating in an airplane embodiment can take the place of memory card updates used in the prior art. Further, the portable memory device 108 can be programmed with a geographical security feature such that, if the vehicle is taken beyond a predefined boundary, the vehicle will shut down. A parent can thus limit a child's ability to take a car beyond a certain predetermined number of streets or neighborhoods. Business drivers can be limited to a predetermined route. Also, rental cars, or others, can be programmed to shut down prior to entering prohibited areas, such as another country, or outside a certain state or county. The same feature can be used to limit the hours a certain driver can use the car (prohibiting, for example, night-time driving) separately from, or in combination with, geographic boundaries, thus allowing enforcement of court orders on driving restrictions, driving restrictions imposed on student drivers and the like, or accessibility to company vehicles.

Due to the storage capacity of the portable memory device 108, the ability to update the data on the portable memory device 108, and its integration with an automobile computer 102, other powerful uses of the navigation system 120 in conjunction with other automobile systems are enabled by the instant invention. For example, the portable memory device 108 can provide both the software and data storage functions to enable a multi-media presentation tied to the geographical location of the automobile. The present invention provides that a driver can receive historical information regarding the area through which the automobile is being driven over either the stereo system or the video system 118. The use of such feature, as well as others described herein, may require additional controls 122 accessible to the driver and linked directly to the computer. These controls 122 can comprise a simple numeric pad or small keyboard accessible to the vehicle occupants or similar devices known in the art.

The portability of the memory device 108, and the fact that it is read and write capable, also adds useful features to the invention for uploading data from various automobile systems. For example, the automobile computer 102 can be connected to various system monitors 114. These system monitors 114 can include monitoring a number of engine performance and functioning parameters as well as trip data such as distance traveled per trip, top and average speed, fuel consumed, etc. . . . Data relating to the information monitored by the system monitors 114 can be collected by the automobile's computer 102 for temporary storage in onboard memory 104 or collected and stored directly on the portable memory device 108. In the event it is initially stored on the onboard memory 104, this information can then be uploaded to the portable memory device 108. The data can then be downloaded by, for example, a personal computer connected to an online source, for analysis of engine performance and other stored data. Such analysis can identify engine problems and be used for other maintenance purposes. This aspect of the invention has useful applications in the car rental business. A renter can be issued a portable memory device 108 for use with a rental car or, alternatively, rental enabling data can be loaded onto such device 108 maintained by the renter. Upon the return of the car, all trip information can be retrieved by the rental company making car return a simple matter of returning the portable memory device 108 or dumping data from the device 108 to the rental car company's computer. This trip information can include driving patterns, such as average and high speeds, brake usage, etc. . . . , that can be used to promote safe driver discounts. The mileage and fuel usage information can also be processed for quick and accurate returns by, for example, rental car company employees using portable reading devices during the return check-in.

Along the lines of data storage, the portable memory device 108 can be used to record and store music and video files that were played in real time on the automobile's A/V system 118. Likewise, some automobiles have onboard or built-in telephone systems. The portable memory device 108 can store telephone numbers for use with this telephone system and can upload recordings of telephone conversations. Likewise, the integration of a built-in or plug-in microphone with the computer of this invention allows for dictation with the dictation data stored directly on the portable memory device 108. In communication with the navigation unit 102, data can also be loaded onto the portable memory device 108 detailing the exact route taken on trips as well as times associated with stops. This information can be useful for parental monitoring of children drivers or company monitoring of company employees.

Figure 2:
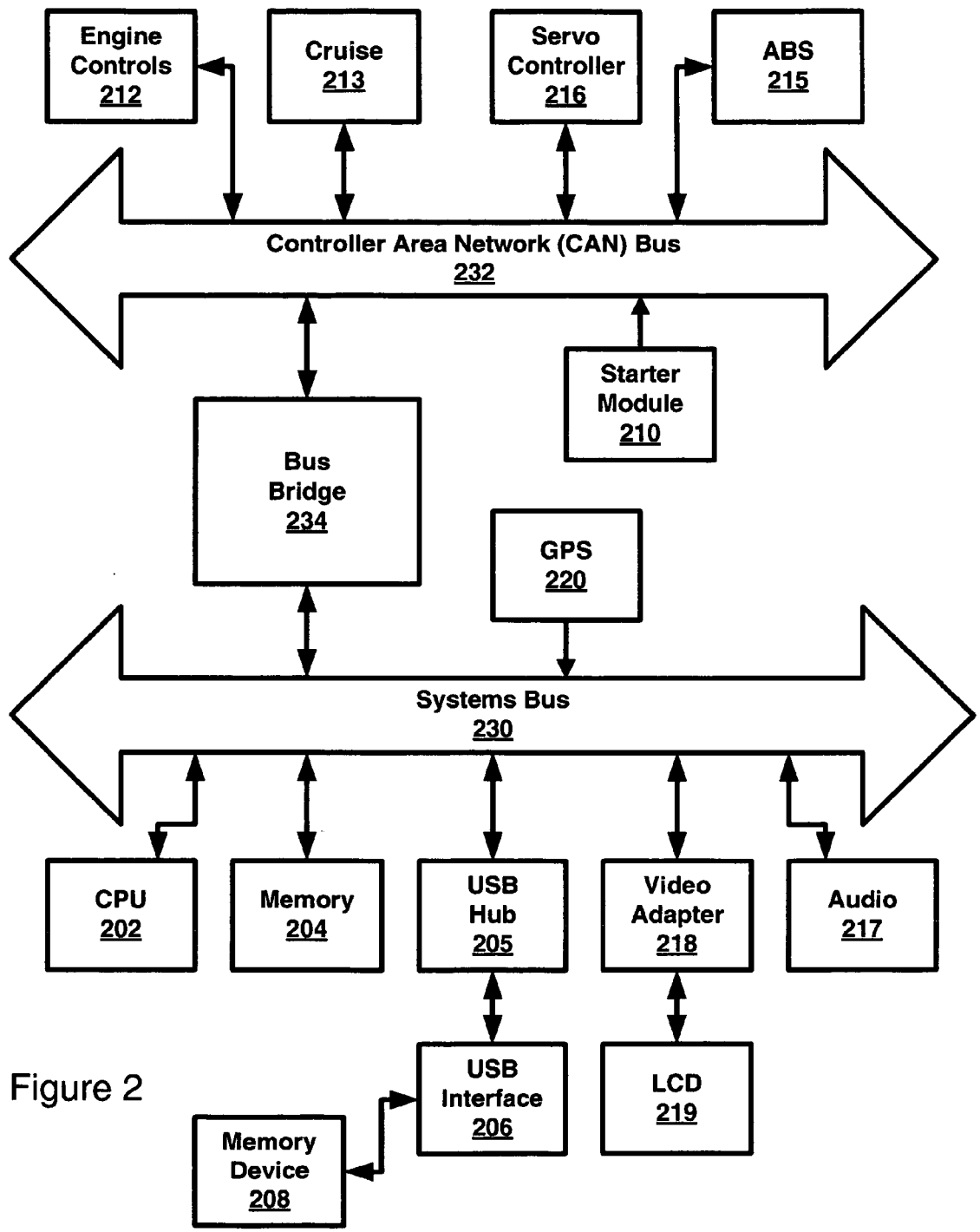
FIG. 2 is a flow chart showing the systems interface of one embodiment of the invention.

FIG. 2 is a flow chart showing the system interfaces of one embodiment of the invention utilizing the invention with an automobile. FIG. 2 shows two electrical buses 230, 232 comprising a controller area network (CAN) bus 232 and a systems bus 230 interconnected by a bus bridge 234. By way of example only, the CAN bus 232 is typical of prior art systems and drives the engine controls 212, the cruise control 213, the servo-controllers 216, which can control the seat positions and electronic mirror positions, and the ABS controller 215 for controlling the anti-lock brake system. The CAN bus 232 is also interfaced with the starter module 210.

The systems bus 230, on the other hand, handles many of the automobile systems including the GPS unit 220, the audio system 217, which can include the radio, a cd-player, etc., and a video adapter 218. The video adapter 218 in turn can drive the video equipment 219, such as an LCD video screen 219.

In the embodiment disclosed in FIG. 2, the system bus 230 is also connected to a central processing unit 202 along with onboard memory 204. In the particular embodiment illustrated using USB technology, the system bus 230 is also connected to a USB hub 205, which in turn is connected to a USB interface 206. The USB interface 206 is used to interface with the portable memory device 208 as previously described. The USB hub 205 and interface 206 can be aftermarket additions or originally installed equipment.

Although most of the examples provided have involved the use of the invention with the automobile, it can be understood by one familiar with the art that the same advantages of the invention can be had when used with other means of conveyance, such as an airplane, a boat, a tractor or other farm equipment, a piece of heavy machinery, a motorcycle, a snowmobile, a jet ski, an electric cart, a moped, and any other motorized means of conveyance. As an example of an aviation-specific application, many airplanes today utilize GPS systems that require constant updating of the database used by the GPS system in order to reflect changes in the airspace system. Typically, these databases are updated on a monthly basis and require either the inserting of a new memory card or the downloading of additional data onto an existing memory card from an online source onto a memory card writing device. The same functionality can be used with the portable memory device 108, whereby current navigational data can be downloaded to the portable memory device 108 periodically from an online source and, in turn, downloaded to the onboard GPS unit for the airplane.

Many of the same functions that have been described with regard to automobile rentals or automobile fleet usage have applications in other fields as well, such as boat rentals, motorcycle rentals, and other recreational vehicles such as jet skis and snowmobiles. For example, geographical limitations can be imposed on jet skis such that they become inoperative anytime they are removed from a certain body of water. Geographical limitations can also be imposed on snowmobiles such that they cannot be driven into areas of restricted access, such as wilderness areas. Further, rental usage information similar to that described with regard to rental cars can be uploaded during usage of the conveyance for later analysis by the renter.

The foregoing is merely illustrative of the principals of this invention, and various modifications can be made by those skilled in the art without departing from the scope and spirit of the invention. It should be understood, for example, that the systems described herein can be adapted to other vehicles besides automobiles, such as motorcycles, boats, and airplanes.

The invention claimed is:

1. An ignition system for a transportation conveyance comprising:
   a portable memory device receiving port;
   an onboard processing unit in electrical communication with said port and the ignition system; and
   a portable memory device, wherein said memory device is read and write capable and has a storage capacity of at least 64 MB, wherein further said portable memory device is inserted into said port, thereby allowing data transfer from said device to said processing unit for initiating the operation of the transportation conveyance.

2. The ignition system of claim 1 wherein said portable memory device is a USB portable flash drive.

3. The ignition system of claim 1 wherein said portable memory device receiving port is a USB port located near the operator's position inside the conveyance.

4. The ignition system of claim 1 wherein said portable memory device is read in order to enable operator preference settings for the conveyance components, said components comprising mirrors and an adjustable seat.

5. The ignition system of claim 1 wherein said portable memory device is accessible for the transfer of data from the portable memory device to an entertainment media in the conveyance.

6. The ignition system of claim 5 wherein said entertainment media comprises a radio.

7. The ignition system of claim 5 wherein said entertainment media comprises an audio/visual system.

8. The ignition system of claim 1 wherein said portable memory device interfaces with an onboard navigation system.

9. The ignition system of claim 8 wherein said onboard navigation system is a Global Positioning System.

10. The ignition system of claim 1 wherein said portable memory device interfaces with engine controls.

11. The ignition system of claim 1 wherein said portable memory device interfaces with system monitors.

12. The ignition system of claim 1 wherein said portable memory device uses FireWire technology.

13. A transportation conveyance ignition system that utilizes a read and write capable portable memory device in lieu of an ignition key, said ignition system comprising:
    a portable memory device receiving port; and
    an onboard processing unit in electrical communication with said port and the ignition system;
wherein said portable memory device is inserted into said port, thereby allowing data transfer from said processing unit for initiating the operation of the conveyance.

14. The ignition system of claim 13 wherein said portable memory device is a USB portable flash drive.

15. The ignition system of claim 13 wherein said portable memory device receiving port is a USB port located near the operator's position inside the conveyance.

16. The ignition system of claim 13 wherein said portable memory device is read in order to enable operator preference settings for conveyance components, said components comprising side mirrors and an adjustable seat.

17. The ignition system of claim 13 wherein said portable memory device has a storage capacity of at least 64 MB.

18. A conveyance ignition system comprising:
    a USB port located near the operator's position inside the conveyance;
    an onboard processing unit in electrical communication with said port and the ignition system; and
    a USB portable flash drive;
wherein said USB portable flash drive is inserted into said USB port, thereby allowing data transfer from said drive to said processing unit for initiating operation of the conveyance.

19. The ignition system of claim 18 wherein said portable memory device is read in order to enable operator preference settings for conveyance components, said components comprising side mirrors and an adjustable seat.

20. The ignition system of claim 18 wherein said portable memory device has a storage capacity of at least 64 MB.

* * * * *